April 26, 1949.  W. M. COCHRANE ET AL  2,468,039
DRESSING TOOL
Filed May 10, 1946  3 Sheets-Sheet 1

INVENTORS
Wallace M. Cochrane
Hans A. Hanson
By
J. H. Church & H. E. Thibodeau Attys.

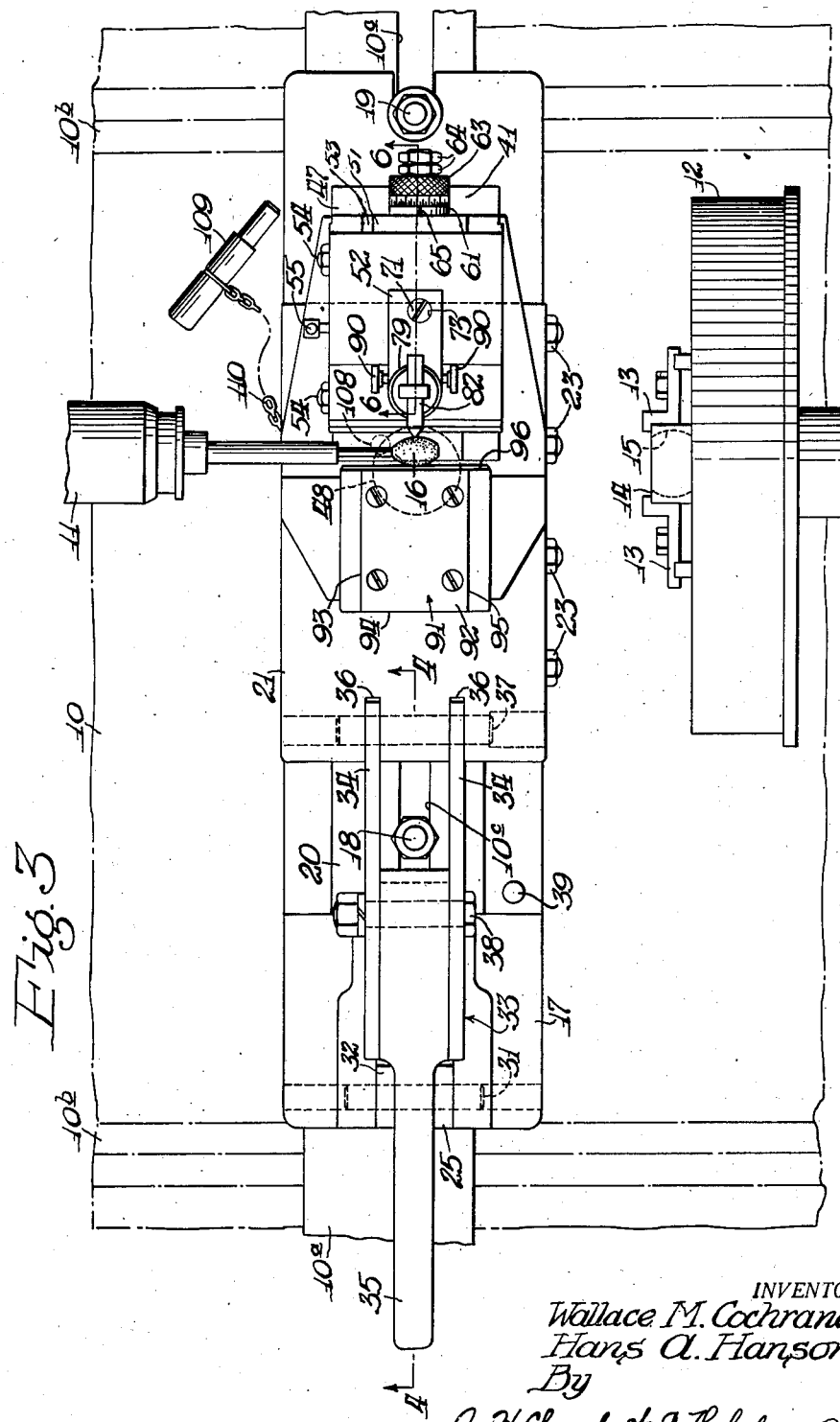

April 26, 1949.    W. M. COCHRANE ET AL    2,468,039
DRESSING TOOL
Filed May 10, 1946    3 Sheets-Sheet 3
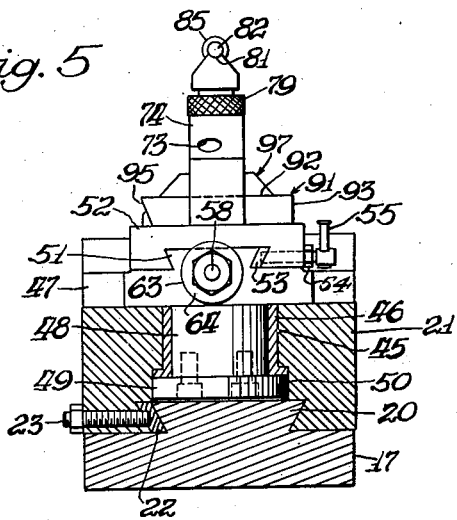
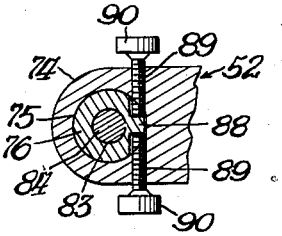
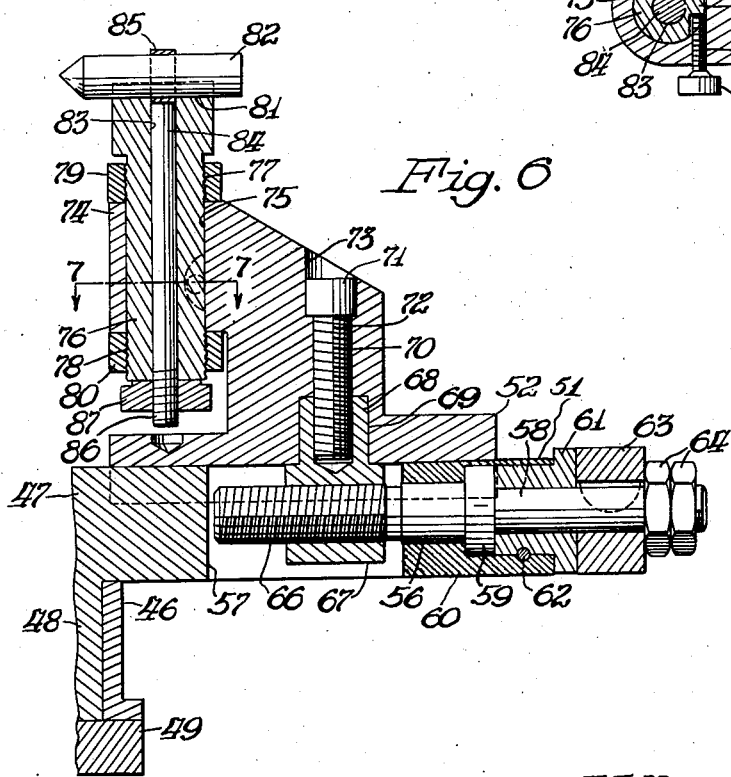
INVENTORS
Wallace M. Cochrane
Hans A. Hanson
By
J. H. Church & W. E. Thibodeau Attys.

Patented Apr. 26, 1949

2,468,039

UNITED STATES PATENT OFFICE 2,468,039

DRESSING TOOL

Wallace M. Cochrane, Davenport, Iowa, and
Hans A. Hanson, South Bend, Ind.

Application May 10, 1946, Serial No. 668,999

15 Claims. (Cl. 125—11)

(Granted under the act of March 3, 1883, as
amended April 30, 1928; 370 O. G. 757)

The invention described herein may be manufactured and used by or for the Government for governmental purposes without the payment to us of any royalty thereon.

This invention relates to a machine tool and more particularly to a tool of the type for dressing grinding wheels. In its specific aspects the invention relates to a tool having a swingable dressing point adapted to dress grinding wheels having arcuate contours.

In the manufacture of various components, machining operations are followed by precision grinding operations. The grinding operations are most successfully accomplished by the use of grinding wheels having contours conforming to the desired shape of the finished component. In order that the utmost accuracy and precision may be obtained in work such as this, it is necessary that the grinding wheel be rough dressed and then finish dressed to secure the proper contour thereon. Although dressers of the general type referred to have been commonly used heretofore, such dressers ordinarily involve rather prolonged interruption of the grinding operation on the product or component and in certain instances it is necessary to remove the grinding wheel from the grinding machine for the purpose of dressing the wheel in a different machine.

It is a principal object of the present invention to provide a contour dresser constructed as an attachment for the machine in which the grinding operation is being performed and to embody in such attachment a shiftable tool support that may be moved from a work position in which the grinding wheel may be dressed to an idle position in which the dressing tool is disposed remote from the grinding wheel and out of the way of the work on which the grinding operation is being performed.

It is an important object of the invention to provide means on the dressing attachment for determining the position of the dressing tool so that the contour followed by the tool will be accurately defined.

It is another important object of the invention to provide removable gaging means and to adapt the attachment to receive different types and sizes in such gage means.

The invention has for another object the provision of means for moving the dressing tool between its work position and its idle position; and the provision of simple and effective means for locking the tool in either of its positions.

Still another object of the invention is the provision of novel tool-carrying means adapting the tool for adjustment through a variety of ranges.

The foregoing and other important objects and features of the invention will become apparent as the disclosure of a preferred form of the invention is completely set forth in the following detailed description and accompanying sheets of drawings in which:

Fig. 5 is a vertical sectional view taken substantially on the line 5—5 of Fig. 1 and illustrating the relationship between the main support and pivoting base;

Fig. 6 is a fragmentary longitudinal sectional view taken on the line 6—6 of Fig. 3 and illustrating the means for supporting the dressing tool; and Fig. 7 is a transverse sectional view taken on the line 7—7 of Fig. 6 and illustrating one of the means for adjusting the dressing tool.

Although the present disclosure pertains in its specific aspects to a tool for dressing grinding wheels, it will be appreciated that certain of the several features thereof will be found similarly applicable to machine tools of other types. Accordingly, the disclosure herein should be taken as illustrative and not limiting.

Figure 1:
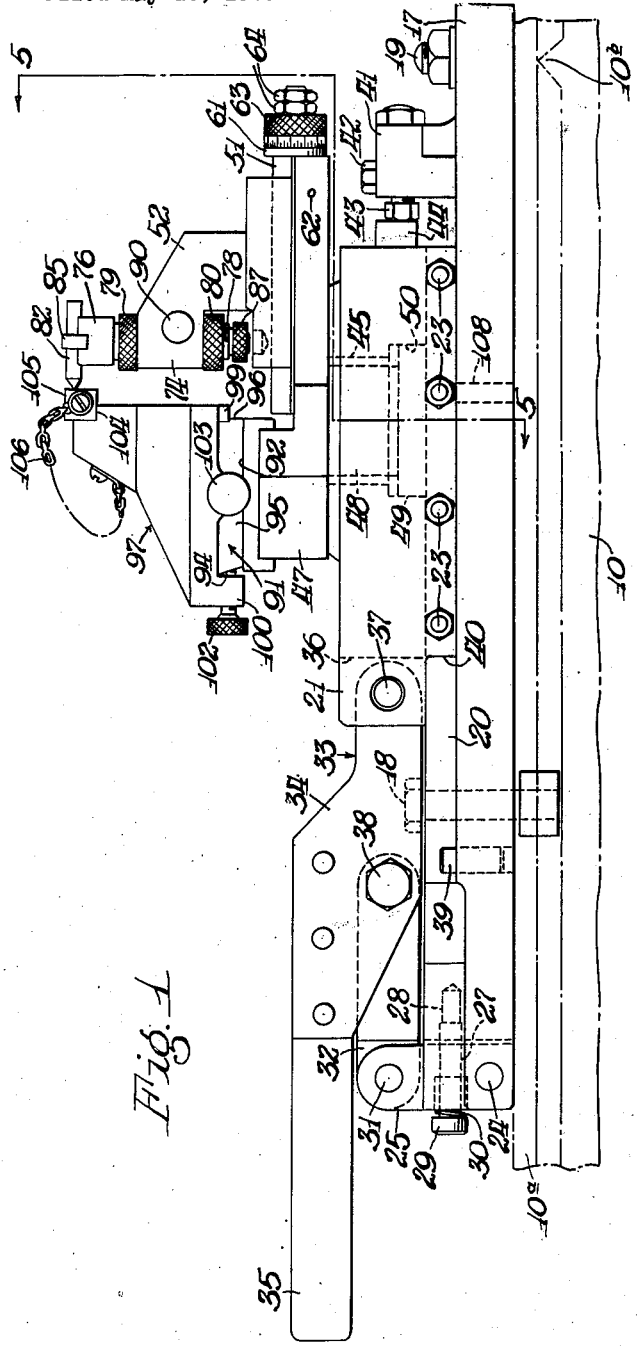
Fig. 1 is a side elevation of the dressing attachment, the view illustrating the function of the gage means in determining the position of the dressing tool.
Figures 3, 4:
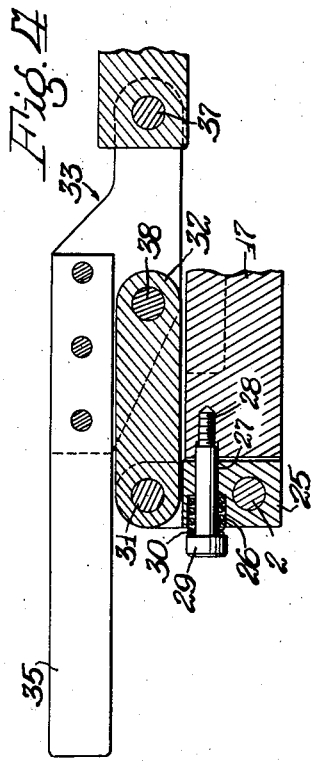
Fig. 3 is a plan view of the structure shown in Fig. 1, the gaging means having been removed.
Fig. 4 is a fragmentary longitudinal sectional view taken on the line 4—4 of Fig. 3 and illustrating the overcenter lock for maintaining the tool in work position.
Figure 2:
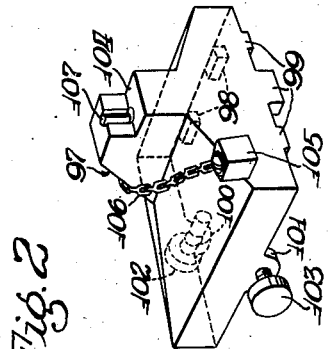
Fig. 2 is a perspective view of the gage means per se.

As stated above, the preferred form of invention illustrated herein is provided as an attachment for a machine of the type adapted to perform grinding operations, and the attachment as such is embodied in such form that it may be mounted on such machine so that it may be shifted from a work position in which the dressing operation may be performed to an idle position in which it will not interfere with the function of the machine during the grinding operation. In one particular instance, the grinding operation is performed in a machine, such as a lathe, having a horizontal bed and a horizontal rotatable spindle or chuck in which the grinding wheel or element is carried. Portions of such machine are illustrated in Figs. 1 and 2 herein. The reference numeral 10 designates the horizontal bed and the numerals 11 and 12 designate respectively a rotatable spindle and a work-supporting chuck. The chuck is rotatable and includes suitable means 13 for supporting a workpiece or component 14 having a bore or similar internal recess requiring grinding on a particular contour, such contour being indicated in dotted lines by the numeral 15. The rotatable spindle 11 carries for rotation therewith a coaxial grinding wheel 16 which, as best seen in Fig. 3, has an arcuate contour formed about a center and on a radius of a predetermined dimension. As will be hereinafter more fully brought out, the grinding operation in the present instance is performed by shifting the grinding wheel 16 and work 14 axially toward each other so that the grinding wheel 16 enters the component 14 and engages the contour 15 therein.

The dressing unit illustrated herein comprises a main support 17 rigidly but removably secured by bolts 18 and 19 to a transverse tool support 10a on the bed 10. The bed is provided with conventional longitudinal ways 10b and the support 10a is carried thereby for adjustment longitudinally of the axis of the spindle 11. The support 10a is provided with means accommodating adjustment of the support 17, such means taking the form of slots 10c through which the attaching bolts 18 and 19 are passed. The longitudinal extent of the support 17 is transverse or normal to the axis of rotation of the grinding wheel 16. The upper surface of the support 17 is formed with a guideway 20 longitudinal with respect to the support and transverse to the axis of the grinding wheel 16. For the purpose of clarity in the following description, reference to longitudinal and transverse movement will be made with respect to the longitudinal extent of the support 17 unless otherwise specified.

The guideway 20 carries thereon a base member 21 having its under surface formed with a guideway that is complementary to the guideway 20. In this manner the base 21 is carried on the support 17 for movement in a longitudinal path. The guideway in the base member 21 is provided with a bearing strip 22 of any conventional material suitably held in place by a plurality of studs 23. The support 17 is provided at its end remote from the axis of the grinding wheel 16 (or the left-hand end as viewed in Figs. 1 and 3) with a transverse pivot pin 24 on which is pivoted an upstanding arm 25. As best shown in Fig. 4, the arm 25 is provided with a bore 26 and a reduced counter-bore 27 on an axis disposed longitudinally with respect to the support 17. The proximate end portion of the support 17 is provided with a coaxial tapped bore 28. An adjusting screw 29 is passed through the bores 26 and 27 and is threaded into the tapped bore 28 in the suport 17. A coil spring 30 encircles the adjusting screw 29 and is contained in the larger bore 26 in the arm 25. The upper end of the arm 25 is provided with a transverse bore that receives a pivot pin 31. This pin serves to pivotally connect to the arm 25 a link 32 that extends inwardly toward the axis of the grinding wheel 16. A second link means 33, comprising a pair of parallel links 34 and an operating handle 35, is connected between the link 32 and the base member 21. As best shown in Fig. 3, the left-hand end of the base member 21 is formed with a pair of slots 36 in which the right-hand ends of the links 34 are loosely fitted. A pivot pin 37 is passed through the base member 21 and the ends of the link members 34 for pivotally connecting these elements together on a transverse axis. The link means 33 is pivotally connected intermediate its ends to the right-hand end of the link 32, the pivot being provided on a transverse axis by pivot means in the form of a bolt 38.

From the description thus far it will be seen that the base 21 may be shifted between two positions by means of the handle 35. When the handle 35 is raised, the links 32 and 33 will pivot upwardly about the axis of the bolt 38 and the base member will be drawn to the left-hand end of the support 17 or to a position remote from the axis of the grinding wheel 16. The support 17 is provided near its left-hand end with stop means in the form of an upright pin 39. When the base member 21 moves to the left, a cutout portion 40 thereof engages the stop pin 39. When the handle 35 is in its down position, as shown in Figs. 1, 3 and 4, the base 21 is in its right-hand position. This position of the base is determined by adjustable stop means provided at the right-hand end of the support 17. As best shown in Fig. 1, this end of the support is provided with an upstanding crossbar 41 rigidly secured to the support by a pair of bolts 42 (only one of which is shown). An adjusting member in the form of a bolt 43 is threaded into the crossbar 41 for adjustment on a longitudinal horizontal axis. An abutment member 44 is rigidly carried at the right-hand end of the base 21 and cooperates with the adjusting bolt 43 for the purpose of determining the right-hand or work position of the base 21. The relationship between the linkage 25—32—33 is such as to provide an overcenter lock for the base 21 when the base is in the position shown in Fig. 1. The resilient mounting of the arm 25 on the end of the support 17 accommodates variations in adjustment of the adjusting screw 43 at the other end of the support 17 and in addition contributes to the effectiveness of the overcenter lock.

As best shown in Fig. 5, the base 21 is provided with pivot means on a vertical axis. For this purpose the base 21 is formed with a vertical bore 45 which is fitted with a bushing or bearing 46. A secondary base or tool-carrying member 47 is mounted on the base 21 and has a depending pivot member 48 rigidly secured thereto and rotatably carried in the bearing 46. A circular cap 49 is secured to the pivot member 48 at the bottom thereof and is retained in a counter-bore 50 at the end of the bore 45 in the base 21. The axis of the bearing 46 is coincident with the center of the circle on which the contour of the grinding wheel 16 is formed. When the support 17 is mounted on the support 10a, the arrangement is such that the support 17 is pre-set so that this coincidence of axis results, proper positioning of the support 17 being made by means of the slots 10c and bolts 18 and 19 and proper locating of the support 10a being made on the ways 10b of the bed 10.

The tool-carrying member 47 is thus freely pivotally carried by the base 21. The member 47 is provided with a platform or bed 51 extending horizontally and longitudinally at one side of the vertical axis through the pivot 48. The platform 51 is preferably in the form of a guideway that cooperates with the longitudinal guideway of a tool supporting member 52. A bearing strip 53 of any suitable material is provided between complementary faces of the guideways and is secured therein by a plurality of studs 54. The tool-supporting member 52 is thus carried by the member 47 for longitudinal movement toward and away from the axis of the pivot 48. A locking element in the form of a screw and handle 55 operates between the members 47 and 52 to maintain the adjusted position of the member 52.

As best shown in Fig. 6, the member 47 is provided at its right-hand end with a longitudinal bore 56 that opens inwardly of the member to a cutout portion 57 formed therein. The bore 56 provides means in the member 47 for rotatably carrying a longitudinal adjusting screw 58. This screw is provided intermediate its ends with an integral collar 59 that fits in a counter-bore 60 adjacent the bore 56. A short flanged sleeve 61 is snugly fitted in the counter-bore 56 and is retained therein by a cross pin 62. The pin 62 holds the flanged sleeve 61 against rotation and against axial displacement with respect to the member 47, and the flanged sleeve 61 in turn holds the adjusting screw 58 against axial shifting although permitting rotation thereof. The right-hand end of the screw 58 has keyed thereto an adjusting knob 63. The outer extreme end of the screw 58 is threaded and receives a pair of locking nuts 64 for holding the adjusting knob 63 in place on the screw. As best shown in Figs. 1 and 3, the adjusting knob has a portion thereof knurled and an adjacent portion provided with a plurality of circumferentially spaced indexing graduations. The upper central portion of the flanged sleeve 61 is provided with a single index mark, as at 65, for cooperation with the graduations on the adjusting knob 63. The inner end of the adjusting screw 58 is formed as a threaded shank 66 which passes through the threaded bore of a nut 67. The nut is provided with a vertical shank portion 68 which fits a short vertical bore 69 in an intermediate portion of the tool-supporting member 52. The shank portion 68 of the nut 67 is formed with a tapped bore 70 that receives a threaded cap screw 71, the member 52 being vertically bored as at 72 to receive the cap screw. The upper end of the bore 72 is enlarged as at 73 to receive the head of the cap screw. The construction just described mounts the nut 67 rigidly on the member 52 and adapts the nut for cooperation with the adjusting screw 58 for the purpose of longitudinal adjustment of the member 52 on the member 47.

The upper forward portion of the member 52 is formed as a sleeve 74 provided with a vertical bore 75. This sleeve carries therein a vertical cylindrical member 76 having its upper end threaded as at 77 and its lower end threaded as at 78. A knurled nut 79 is threaded on the upper threaded portion 77 and a similar nut 80 is threaded on the lower threaded portion 78 (Fig. 6). The nuts 79 and 80, in addition to their function of securing the cylindrical member 76 rigidly to the sleeve portion 74 of the member 52, serve also as means for varying the vertical position of the sleeve 76 in the member 52. The upper end of the cylindrical member 76 is enlarged and the top surface thereof is provided with an arcuate recess 81 normally longitudinal with respect to the support 17. This recess serves to seat a tool 82 on the upper end of the cylindrical member 76. In the present instance, this tool is shown as a diamond point dresser particularly adapted for dressing grinding wheels such as the grinding element 16 referred to above. The cylindrical member 76 is axially bored, as at 83, and receives an elongated securing member 84 in the form of an eyebolt having an upper eye portion 85 and a lower threaded shank 86. The eye 85 encircles and receives the dressing tool 82, and a nut 87, threaded on the threaded shank 86, serves to secure the tool 82 in position on the cylindrical member 76.

As best shown in Fig. 7, the cylindrical member is longitudinally cut out intermediate its ends in an arcuate fashion on opposite sides of a plane passed through the center thereof to provide an ear or lug 88. The sleeve portion 74 of the member 52 is provided with a pair of coaxial tapped bores 89 in each of which is received an adjusting screw 90. These screws respectively engage opposite sides of the lug or ear 88 and may be selectively rotated to vary the angular position of the cylindrical member 76 about its axis in the member 52.

As best shown in Fig. 3, the member 47 is provided with a second platform structure designated generally by the numeral 91. This platform has a flat, accurately machined top surface 92 and four sides 93, 94, 95 and 96. The sides 93 and 96 are accurately machined and serve as locating means for a gaging unit, as will appear below. As best shown in Fig. 1, the side 94 is disposed at a slight angle to the top surface 92. As best shown in Fig. 5, the side 95 is similarly angled. The top surface and side portions of the platform 91 are formed as stated for the purpose of locating on the member 47 means for accurately determining the correct location of the dressing tool 82.

The arrangement of the dressing unit is such that the vertical axis about which the member 47 pivots on the base 21 is coincident with the axis about which the arcuate contour of the grinding wheel is formed. The sides and top of the platform 91 cooperate with complementary portions on gage means removably mountable on the platform for gaging the position of the tool 82. The main component of the gaging means is illustrated in perspective in Fig. 2 and is designated by the numeral 97. This element is shown in position on the platform 91 in Fig. 1. As best shown in Fig. 2, the element 97 includes at one side thereof a pair of depending locating lugs 98. A plurality of similar locating lugs 99 is provided at a front edge of the element 97. When this element is mounted on the platform 91, the under surface thereof seats on the top surface 92 of the platform 91 and the locating lugs 98 and 99 respectively seat against the sides or edges 93 and 96 of the platform. The remaining side portions of the element 97 are respectively provided with depending ears 100 and 101. Locking screws 102 and 103 are respectively threaded into the ears 100 and 101. As best shown in Fig. 1, the shank portions of the locking screws 102 and 103 respectively engage the angled sides or edges 94 and 95 of the platform 91 and serve as means for rigidly mounting the element 97 on the platform.

The upper right-hand portion of the element 97 is cut out as at 104 to provide a seat for a removable gage block 105. This gage block is preferably attached by a short length of chain 106 to the element 97 to prevent loss thereof. The dimensions of the block 105 are determined according to the radius of the particular grinding wheel to be dressed. In the present instance, the block 105 is sized on the basis of the radius of the arc forming the contour of the grinding wheel 16. The block-receiving seat 104 is provided at the vertical face thereof with an index element 107 (Fig. 2). The vertical edge of this element will, when the gage element 97 is correctly positioned on the platform 91, be aligned with the projected vertical axis through the vertical pivot 48 between the member 47 and the base 21. It will be understood that the components of the platform 91 and of the gage element 97 are initially machined so that the alignment between the axis of the pivot 48 and the index element 107 is accurate.

When the handle 35 is raised to withdraw the dressing unit to its idle or left-hand position, the base 21 moves to the left and uncovers a vertical bore 108 in the support 17 (Figs. 1 and 3). A stop pin 109 attached by a chain 110 to the support 17 is insertable in the bore 108 and serves as a lock to prevent accidental return movement of the unit to work position.

*Operation*

The support 17 is first located on the bed 10 so that the vertical axis of the bearing 48 is coincident with the center of the curve of the grinding wheel 16. Proper positioning of the support 17 is accomplished by means of the adjustments provided by the slots 10c in the support 10a and the ways 10b on the bed 10. This location is made in the usual manner with appropriate measuring instruments and gages and is permanent as far as concerns the particular dressing operation. The tool 82 is then correctly positioned by means of the gage element 97 and gage block 105, after which the gage element 97 is removed from the platform 91 so that the dressing operation may be performed on the grinding wheel 16. During this phase of operation of the unit, the handle 35 is down as in Fig. 1 and the unit is in its work position; that is, in such position that the member 47 may be swung about the vertical axis provided by the bearing 48, with the dressing tool 82 properly positioned to dress the desired contour on the grinding wheel 16. After the dressing operation is complete, the handle 35 is raised and this withdraws the unit to its left-hand or idle position out of the way of the grinding operation.

It will be necessary, of course, to locate the dressing tool 82 properly before the dressing operation can be performed. To accomplish this result it is desirable that the dressing unit be moved to its idle position. The gage element 97 is then located on the platform 91 by the means heretofore described and the locking screws 102 and 103 are tightened so that there is no relative movement between the gaging element 97 and the platform 91. Before the block 105 is placed on the seat 104, the adjusting knob 63 is rotated so that the tool-carrying member 52 is run in toward the gage element 97 to a point at which the height and longitudinal alignment of the dressing tool may be determined. The upper point of the index element 107 determines the proper height of the tool 82. Adjustments are made by means of the nuts 79 and 80 so that the tool 82 is accurately positioned vertically. Adjustments made by the adjusting screws 90 will correctly position the tool 82 with respect to angularity so that the longitudinal center line of the tool is aligned with the index element 107. The adjusting knob 63 is then backed off to allow sufficient room for the mounting of the gage block 105 on the gage block seat 104. The member 52 is then run back in by means of the adjusting knob 63 until the point of the tool just contacts the side of the gage block 105 (Fig. 1). The gage block 105 is made preferably square so that no error can occur in the mounting thereof in the seat 104. As previously stated, each dimension of the block 105 equals the radius of the contour of the grinding wheel 16. When a grinding wheel of larger or smaller radius is used, a gage block of corresponding size is substituted for the block 105. The adjustments thus made are secured and the gage element 97 and block 105 are preferably removed. The dressing unit is then returned to work position and it is now ready to perform the dressing operation on the grinding wheel 16. The spindle 11 that mounts the grinding wheel 16 is retractable and thus the grinding wheel 16 may be moved into and out of the path of movement of the dressing unit as the unit is moved between work and idle position. The operator of the machine merely swings the unit back and forth about the vertical pivot 48 until the grinding wheel 16 is satisfactorily dressed.

It will be seen from the foregoing that a simple and accurate dressing unit has been provided for the purpose of accomplishing precision dressing of contoured grinding tools. It will be appreciated, of course, that certain of the features of the invention are similarly applicable to the use of other tools in other instances. Likewise, it will be understood that the foregoing description and illustrations of the invention pertain to only a preferred embodiment thereof and that numerous modifications and alterations may be made therewithout departing from the spirit and scope of the invention as defined in the appended claims.

We claim:

1. In a machine for dressing grinding wheels and the like, the combination of a base member, a secondary base member, means mounting said secondary base member on said base member for pivoting about a vertical axis, a tool support, means mounting said tool support on said secondary base member for longitudinal adjustment through a horizontal path toward and away from the aforesaid vertical axis, a tool-carrying member, means mounting said tool-carrying member on said tool support for adjustment with respect to said vertical axis, a dressing tool carried by said tool-carrying member and normally positionable in a predetermined position with respect to the aforesaid vertical axis whereby when said secondary base member is pivoted on said vertical axis said tool will be swung in an arc having said first vertical axis as its center, gage means removably carried by said secondary base member for determining the desired position of said tool with respect to said vertical axis, said means including a member removably carried by said secondary base member and having a seat constructed and arranged to lie in close proximity to said tool, means on said seat for aligning said seat with said vertical axis, means on said seat for indicating correct longitudinal alignment of said tool with said vertical axis, and a removable gage block positionable between said seat and said tool for determining the distance between said vertical axis and said tool.

2. In a machine for dressing grinding wheels and the like, the combination of a base member, a secondary base member, means mounting said secondary base member on said base member for pivoting about a first axis, a tool support, means mounting said tool support on said secondary base member for adjustment through a path toward and away from the aforesaid axis, a tool-carrying member, means mounting said tool-carrying member on said tool support for adjustment with respect to said axis, a dressing tool carried by said tool-carrying member and normally positionable in a predetermined position with respect to said axis whereby when said secondary base member is pivoted on said axis the dressing point of said tool will be swung in an arc having said axis as its center, gage means removably carried by said secondary base member for determining the desired position of said tool with respect to said axis, said means including a member removably carried by said secondary base member and having a seat constructed and arranged to lie in close proximity to said tool, means on said seat for aligning said seat with said axis, means on said seat for indicating alignment of said tool with said axis, and a removable gage block positionable between said seat and said tool for determining the distance between said axis and said tool.

3. In a machine for dressing grinding wheels and the like, the combination of a base member, a secondary base member, pivot means mounting said secondary base member on said base member, a tool support, means mounting said tool support on said secondary base member for adjustment through a path toward and away from the axis of said pivot means, a tool-carrying member, means mounting said tool-carrying member on said tool support for adjustment in a path paralleling said axis, a dressing tool, means mounting said tool on said tool-carrying member, said axis, gage means removably carried by said base member for determining the desired position of said tool with respect to said axis, said means including a member carried by said secondary base member and having a seat constructed and arranged to lie in close proximity to said tool, means on said seat for aligning said seat with the aforesaid axis, means on said seat for setting the position of said tool-carrying member, and a removable gage block positionable between said seat and said tool for determining the distance between said axis and said tool.

4. In a machine for dressing grinding wheels and the like, the combination of a base member, a secondary base member, means mounting said secondary base member on said base member for pivoting about a vertical axis, a tool support, means mounting said tool support on said secondary base member for longitudinal adjustment through a horizontal path toward and away from the aforesaid vertical axis, a tool-carrying member, means mounting said tool-carrying member on said tool support for adjustment, a dressing tool carried by said tool-carrying member and having a dressing point normally positionable in a predetermined position with respect to the aforesaid vertical axis so that the dressing point of said tool may be swung in an arc having said vertical axis as its center when said base member is pivoted on said vertical axis, gage means removably carried by said base member for determining the desired position of the dressing point of said dressing tool with respect to said vertical axis, said means including a member carried by said secondary base member and having a gage-block-receiving portion constructed and arranged to lie in close proximity to said dressing tool, means on said gage-block-receiving portion for aligning said gage-block-receiving portion with the aforesaid vertical axis, means on said gage-block-receiving portion for indicating correct longitudinal alignment of said tool with said first vertical axis, and a removable gage block positionable between said gage-block-receiving portion and said dressing tool for determining the distance between the aforesaid vertical axis and the dressing point of said tool.

5. In a machine tool, the combination of a base member, a secondary base member, means mounting said secondary base member on said base member for pivoting about a first vertical axis, a tool support, means mounting said tool support on said base member for longitudinal adjustment through a horizontal path toward and away from the aforesaid vertical axis, a tool-carrying member, means mounting said tool-carrying member on said tool support for angular adjustment about a vertical axis paralleling the aforesaid first vertical axis, a tool carried by said tool-carrying member, means mounting said tool on said tool-carrying member for vertical adjustment, gage means removably carried by said base member for determining the desired position of said tool, said means including a member removably mountable on said secondary base member and having a seat constructed and arranged to lie in close proximity to said tool, means on said seat for aligning said gage-block-receiving portion with the aforesaid first vertical axis, means on said seat for indicating correct vertical adjustment of said tool, means on said seat for indicating correct angular adjustment of said tool, and a removable gage block positionable between said seat and said tool for determining the distance between the aforesaid first vertical axis and said tool.

6. In a machine tool, the combination of a base member, a secondary base member, pivot means mounting said secondary base member on said base member, a tool support, means mounting said tool support on said secondary base member for adjustment through a path toward and away from the axis of said pivot means, a tool-carrying member, means mounting said tool-carrying member on said tool support for adjustment laterally of and in a longitudinal path paralleling said axis, a tool carried by said tool-carrying member, gage means removably carried by said secondary base member for determining the desired position of the point of said tool with respect to said first vertical axis, said means including a member carried by said secondary base member and having a seat constructed and arranged to lie in close proximity to said tool, means on said seat for aligning said gage-block-receiving portion with the aforesaid axis, means on said gage-block-receiving portion for indicating correct lateral positioning of said tool, means on said seat for indicating correct longitudinal positioning of said tool, and a removable gage block positionable between said seat and said tool for determining the distance between the aforesaid axis and said tool.

7. In a machine tool, a base member, a secondary base member, means including a pivot on a vertical axis mounting said secondary base member on said base member for pivotal movement, a first platform on said base member at one side of said vertical axis and including a horizontal guideway, a second platform at the other side of said vertical axis diametrically and opposite said first platform, a tool support including means cooperable with the guideway on said first platform for mounting a tool on said secondary base member for movement toward and away from said vertical axis, means for adjusting the position of said tool support on said first platform, a tool, means carrying said tool on said tool support for adjustment with respect thereto and with respect to said vertical axis, a removable gage support mountable on said second platform, and gage means supportable on said gage support and constructed and arranged to gage a predetermined desired position of said tool.

8. In a machine of the class described, a support, a base member carried by said support for movement from a work position to an idle position, a bracket on said support and spaced from said base member to the idle position side thereof, a link pivoted at one end to said bracket and extending toward said base member, a second link pivoted at one end to said base member and extending said first link, means pivotally interconnecting said links, and means for pivoting said links about said pivot means for effecting movement of said base member between work and idle positions.

9. In a machine of the class described, a support, a base member carried by said support for movement from a work position to an idle position, a bracket on said support and spaced from said base member to the idle position side thereof, a link pivoted at one end to said bracket and extending toward said base member, a second link pivoted at one end to said base member and extending said first link, means pivotally interconnecting said links, means for pivoting said links about said pivot means for effecting movement of said base member between work and idle positions, and means for locking said base member to said support in said idle position.

10. In a machine of the class described, a support, a base member carried by said support for movement from a work position to an idle position, a bracket on said support and spaced from said base member to the idle position side thereof, a link pivoted at one end to said bracket and extending toward said base member, a second link pivoted at one end to said base member and extending said first link, means pivotally interconnecting said links, means for pivoting said links about said pivot means for effecting movement of said base member between work and idle positions, and means for locking said base member to the support in said work position.

11. In a machine of the class described, a support, a base member carried by said support for movement from a work position to an idle position, a bracket on said support and spaced from said base member to the idle position side thereof, a link pivoted at one end to said bracket and extending toward said base member, a second link pivoted at one end to said base member and extending said first link, means pivotally interconnecting said links, means for pivoting said links about said pivot means which said links are connected together for effecting movement of said base member between work and idle positions, means for locking said base member to said support in said idle position, and means for locking said base member to said support in said work position.

12. In a machine of the class described, a support, a base member carried by said support for movement from a work position to an idle position, a bracket on said support and spaced from said base member to the idle position side thereof, a secondary member pivoted at one end to said bracket for movement toward and away from said bracket and including a pivot at its other end, spring means for urging said secondary member toward said bracket, a first link pivoted at one end to the pivot of said secondary member and having a pivot at its other end, a second link pivoted to the pivot of said first link and having a pivot at its other end, means including the pivot of said second link for connecting said second link to said base member, said links being normally positioned when the base is in work position so that said pivotal connections thereof to each other and to said bracket and base member to provide an over-center lock and said links and secondary member and spring means being constructed and arranged to maintain said over-center lock on said links, means for pivoting said links to break said lock and to effect movement of said base member toward said bracket, and means including an opening in said support and a removable pin cooperable therewith for locking said base member in its said idle position.

13. In a machine of the class described, a support, a base member carried by said support for movement from a work position to an idle position, a bracket on said support and spaced from said base member to the idle position side thereof, a secondary member pivoted at one end to said bracket for movement toward and away from said bracket and including a pivot at its other end, spring means for urging said secondary member toward said bracket, a first link pivoted at one end to the pivot of said secondary member and having a pivot at its other end, a second link pivoted to the pivot of said first link and having a pivot at its other end, means including the pivot of said second link for connecting said second link to said base member, said links being normally positioned when the base is in work position so that said pivotal connections thereof to each other and to said bracket and base member to provide an over-center lock and said links and secondary member and spring means being constructed and arranged to maintain said over-center lock on said links, and means for pivoting said links to break said lock and to effect movement of said member toward said bracket.

14. Tool-carrying means comprising a tool support, means forming a bore in said support, a carrier angularly and axially movable in said bore and having opposite end portions projecting respectively at opposite ends of said bore, a pair of adjusting members, one for each end portion and cooperable therewith and with the support to adjust said carrier axially and to hold said carrier against axial displacement with respect to said support, means providing an ear rigid on said carrier, means cooperable with said ear to move said carrier angularly with respect to said support and to lock said carrier in any of several angularly adjusted positions, means forming an axial bore through said carrier, a tool-mounting member inserted in said bore in said carrier, means for mounting a tool on said member, and means for securing said member to said carrier.

15. Tool-carrying means comprising a tool support, means forming a bore in said support, a cylindrical carrier angularly and axially movable in said bore and having opposite, threaded end portions projecting respectively at opposite ends of said bore, a pair of threaded adjusting members, one for each threaded end portion and cooperable therewith and with the support to adjust said carrier axially and to hold said carrier against axial displacement with respect to said support, means forming an ear integral with said carrier and intermediate the opposite ends thereof, said ear being disposed in a plane passed through the axis of said carrier, means forming a pair of opposed, aligned, tapped bores in said support on an axis normal to and intersecting said ear, a pair of adjusting screws, one in each tapped bore and engaging a proximate side of said ear, said screws being cooperable with said ear to move said carrier angularly with respect to said support and to lock said carrier in any of several angularly adjusted positions, means forming an axial bore through said carrier, a tool-mounting member passed through said bore in said carrier and projecting at opposite ends thereof, means at one end of said member for mounting a tool, and means at the other end of said member for securing said member to said carrier.

WALLACE M. COCHRANE.
HANS A. HANSON.

REFERENCES CITED

The following references are of record in the file of this patent:

UNITED STATES PATENTS

| Number | Name | Date |
|---|---|---|
| 1,563,900 | Gardner et al. | Dec. 1, 1925 |
| 1,754,630 | Klamp et al. | Apr. 15, 1930 |
| 2,392,668 | Helding | Jan. 8, 1946 |